Sept. 24, 1957 M. R. HATFIELD 2,807,658
SPIRAL-WOUND CATHODE FOR EXTERNAL CATHODE PRIMARY BATTERY
Filed July 9, 1954
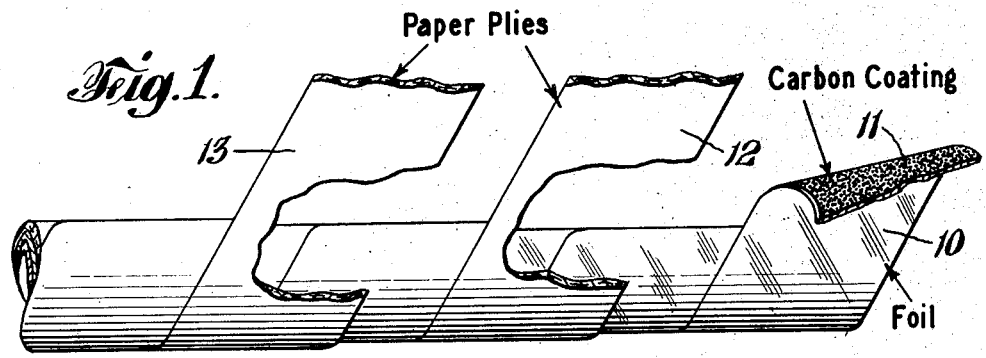
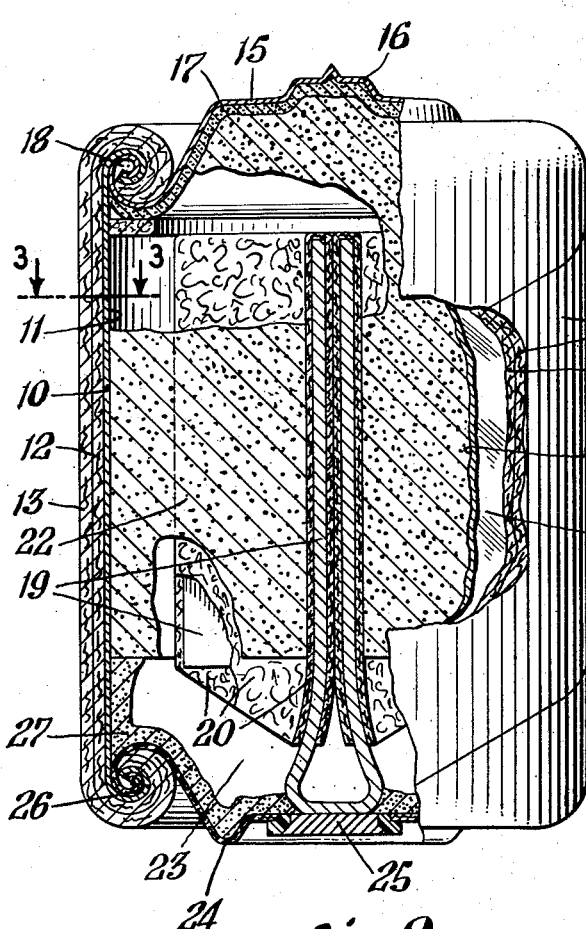
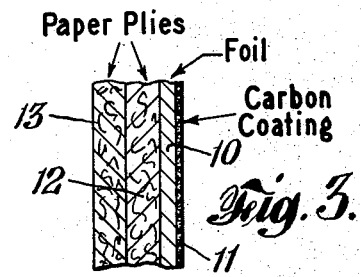
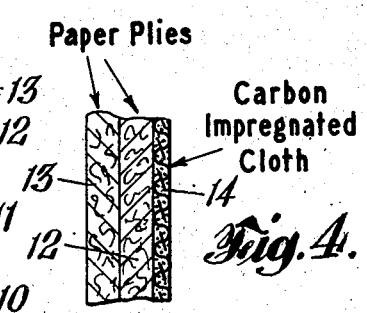
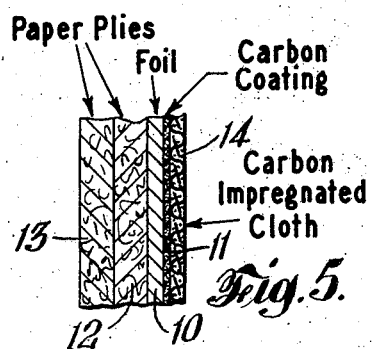
INVENTOR
MARCUS R. HATFIELD
BY
ATTORNEY

United States Patent Office 2,807,658
Patented Sept. 24, 1957

2,807,658

SPIRAL-WOUND CATHODE FOR EXTERNAL CATHODE PRIMARY BATTERY

Marcus R. Hatfield, Rocky River, Ohio, assignor to Union Carbide Corporation, a corporation of New York Application July 9, 1954, Serial No. 442,320

15 Claims. (Cl. 136—107)

This invention relates to primary galvanic cells of the so-called "dry" type.

In the dry cell of the type utilizing a non-consumable carbon cathode adjacent to its container, the practice is to mold within the tube container and in contact with its walls an electrically conductive carbonaceous mixture and suitable binder to form the cathode. Such a cell and the method of its fabrication are described and claimed in Patent No. 2,605,299, issued July 29, 1952. In the dry cell there described and claimed, the carbonaceous cathode is in the form of a lining formed within a paper tube. The forming operation of necessity requires certain mechanical operations that are both time consuming and expensive. It would be desirable, therefore, to provide a simplified and less expensive cell and a simplified and less expensive method of its construction.

One of the objects of the invention is to provide a primary galvanic cell having a laminated, spiral-wound, non-consumable carbon cathode adjacent to and integral with its container.

Another object of the invention is to provide a laminated, spiral-wound, non-consumable carbon cathode for a primary galvanic cell, said cathode being adjacent to and integral with its container.

Another object of this invention is to provide a method for making a laminated, spiral-wound, non-consumable carbon cathode for a primary galvanic cell, said cathode being adjacent to and integral with its container.

The invention by means of which these objects are achieved includes a container-cathode comprising a multi-ply, spiral-wound tube, the innermost ply of which is rendered electrically conductive by a carbonaceous material to serve as the cathode of a cell. As will be explained hereinafter in detail, the tube may be composed of a number of plies and of a number of materials. For instance, it may comprise a number of plies of kraft paper, the innermost carrying an electrically conductive carbonaceous coating. Or the innermost ply may be of metal foil having on its inner side a conductive carbonaceous coating, or may be a carbon-impregnated cloth. The outer ply is a fibrous tape, spiral-wound. The plies together form both the cathode and a container for the cell, thus serving in combination as electrode and cell wall.

In the accompanying drawing:

Fig. 1 is a partially stripped-away section of a spiral-wound tube suitable for a container-cathode according to the invention;

Fig. 2 is a vertical section of a primary galvanic cell with a laminated container-cathode according to the invention;

Fig. 3 is a fragmentary sectional view of a laminated container-cathode according to the invention;

Fig. 4 is a fragmentary sectional view of a modification of a laminated container-cathode according to the invention;

Fig. 5 is a fragmentary sectional view of a modification of a laminated container-cathode according to the invention.

Referring to Fig. 1 a tube for fabrication into a container-cathode of the invention may comprise a spirally wound innermost ply of metal foil 10 having a carbonaceous coating 11 on its inward surface. An intermediate ply 12 and an outermost ply 13 are preferably formed of spiral-wound fibrous material such as ordinary kraft or wrapping paper. A fragmentary sectional view of such construction is shown in Fig. 3. Additional plies of paper may of course be employed for strength if desired. Ordinarily, at least three plies are used for the container-cathode and three plies are sufficient for general purpose cells. A conventional label, not shown, may be applied to the tube.

As an alternate and preferred form of construction, as shown in Fig. 4, the container-cathode of the invention may be formed of a carbon-impregnated porous, open-mesh tape 14, preferably of ordinary muslin cloth, spiral-wound, forming the innermost ply. It is important that the interstices of the cloth tape be completely filled with carbon to render the tape impervious. The intermediate ply 12 and the outer ply are formed preferably, as before, of spiral-wound fibrous material such as ordinary wrapping paper.

The two forms of construction of the container-cathode of the invention as shown in Figures 1 and 3, and in Fig. 4, may be combined as shown in Fig. 5. In this form of construction, the innermost ply, 14 is formed of spiral-wound carbon-impregnated, porous open-mesh tape, preferably of ordinary muslin cloth; adjacent thereto and on the outer side thereof is formed an intermediate ply of a spiral-wound metal foil 10, the surface of which adjacent to said innermost ply 14 is preferably coated with a carbonaceous substance 11 to insure good electrical contact between the foil 10 and the carbon in the interstices of the tape forming the innermost ply 14. The two external plies 12 and 13 are formed, preferably, as before, of spiral-wound fibrous material such as ordinary wrapping paper.

A dry cell with the container-cathode of the invention may comprise, as shown in Fig. 2, a multi-ply container-cathode formed of an outer ply 13 preferably formed of spiral-wound fibrous material such as ordinary wrapping paper. Adjacent to the outer ply 13, on its inner side, is an intermediate ply 12 preferably formed of spiral-wound fibrous material such as ordinary wrapping paper. Adjacent to the intermediate ply 12, on its inner side, is an inner ply 10 formed of spiral-wound metal foil, the inner surface of said metal foil is coated with an electrically conductive carbonaceous material 11 forming the cathode. One end of the container-cathode is closed by a metal cap 15 preferably dished outwardly and provided with a central boss 16, the boss being a terminal for the cell. The inner surface of the cap 15 is coated with a carbonaceous material 17. The cap 15 is tightly secured to the container-cathode, the edges of the container-cathode being rolled or crimped together as shown, for example, at 18.

The anode of the cell 19, preferably composed of zinc, is placed centrally in the cell and is provided with radial vanes or fins. In cross section the anode 19 is preferably X-shaped. It is provided by wrapping, spraying or dipping with a conventional separator 20 of bibulous material such as paper or gel. The vanes of the anode 19 are short enough that their edges do not come in contact with the cathode-lining 11 at any point.

The intervening space in the cell between the anode 19 and the cathode 11 is substantially filled with depolarizer mix 22 of any desired composition leaving an air space 23 through which the stem of the anode 19 extends in the direction of the open end of the container-cathode. The cell may be closed by a member 24 insulated from the carbon 11 but making electrical contact with the anode 19. For example, as shown, the member 24 may be of a stiff fiber board having a metal insert 25 adapted to be soldered, riveted, or welded to the stem of the anode 19, the marginal portions of the member 24 being curled or crimped in liquid-tight engagement with the end of the container-cathode as shown at 26. An internal layer 27 of sealing material, such as wax is preferably applied to the inner surfaces of the closure member 24 in conventional manner.

A preferred method of making the electrode of the invention is set forth as follows: The electrode may be made of either three or more plies as above-indicated. Assuming that three plies are to be used, the outer ply is formed of paper, such as wrapping paper, about 0.01 inch thick. The central or intermediate ply may be made of the same type of paper with a metal foil, for example, aluminum foil, laminated thereto on the surface next to the inner ply in order to enhance longitudinal conductivity of the cell. As extra protection against cell electrolyte, the metal foil surface of the laminate may be covered with a carbon-resin paint or a thin coat of carbon-wax mixture calendered thereon. The inner ply is formed by calendering a mixture of carbon black and/or graphite with a wax binder into the open pores of muslin cloth. It is essential to insure a tight seal between the adjacent laps of this inner ply to prevent cell leakage. This may be accomplished either by producing good butt joints or by the use of an overlap. The three plies are wound in conventional manner on a tube-winding machine, heat being applied during winding to form proper seals at the joints.

The electrically conductive carbonaceous coating above referred to is a mixture of carbon and a binder. Wide variation in proportions of the mixture will give acceptable results. For example, a conductive carbon coating of the type used in making the duplex electrodes of flat-type batteries may be employed. The coating may be of a composition comprising finely divided carbon and a thermoplastic binder, a suitable composition being disclosed and claimed in Patent No. 2,605,300, July 29, 1952, issued to F. A. Shirland, Jr. In this composition, finely-divided graphite having a scaly or flake structure is bonded by a petroleum-base microcrystalline wax, the binder constituting about 10% to 50%, by weight, of the composition. A portion of the graphite, up to about 50%, by weight, may be replaced by a diluent such as talc or mica which is inert to dry cell electrolyte. The addition of a small quantity of a black, for instance acetylene black, has proved advantageous. Good results have been obtained with a composition containing equal parts by weight of artificial graphite and petroleum-base microcrystalline wax, the composition also containing about 10% by weight of acetylene black.

Electrical connection may be provided at one end of the cell by spinning on a metal cover, or top. The spiral wound cathode tube of the invention is capable of being formed into such spun connections either with the metal spun over the tube, or conversely, with the tube spun over the metal. In either case, clean bare metal must be in contact with the inner conductive ply in order to collect the electrical current. The remaining inside area of the metal cover is protected from the battery mix by a coating of resin paint and/or wax. The closure of the other end of the cell usually provides electrical contact with the anode system and, therefore, must be insulated from the cathode layer. Several equally satisfactory means are: A metal end spun on with a flexible insulating material between the metal and the carbon layer; a rigid plastic end plate provided with a metal insert for anode connection beaded or spun over the open end of the cathode tube, with or without a metal ring insert, thus turning under the conductive layer, after which a suitably shaped metal or plastic cover may be sprung into place and held by spring tension and/or an adhesive.

What is claimed is:

1. A combination electrode and cell wall for a primary galvanic cell, comprising a multi-ply tube including an inner electrically conductive carbonaceous ply, an outer non-conductive ply concentrically disposed with respect to said inner ply, and at least one intermediate reinforcing ply therebetween and contiguous therewith, each of said plies comprising an elongated strip spirally wound to define a plurality of adjacently disposed laps.

2. In the multi-ply tube of claim 1, said inner ply being of metal foil having a carbonaceous coating on its inner surface.

3. In the multi-ply tube of claim 1, said inner ply comprising a carbon impregnated cloth.

4. In the multi-ply tube of claim 1, said inner ply comprising a fibrous material having on the inside surface thereof a carbon coating.

5. In the multi-ply tube of claim 1, said intermediate and outer plies being of fibrous material.

6. In the multi-ply tube of claim 1, said outer ply constituting the cell wall of said cell, and said inner ply constituting one of the electrodes of said cell.

7. A method of producing a combination cell wall and electrode for a primary galvanic cell, the method comprising spirally winding an electrically conductive carbonaceous strip of material to form an inner tubular ply, simultaneously heating said strip during winding to provide leakproof joints between adjacent laps of said inner ply, and spirally winding thereover a plurality of non-conductive strips of materials to form multiple outer plies.

8. A method of producing a combination electrode and cell wall for a primary galvanic cell, comprising coating an elongated metal foil on one surface thereof with an electrically conductive carbonaceous material, spirally winding said foil to define an inside-coated tube, simultaneously heating said foil during winding to render the inside of said tube seal-tight, spirally winding strips of non-conductive material on the outside of said tube to form concentrically disposed outer plies adjacent therewith.

9. A method of producing a combination cell wall and electrode for a primary galvanic cell, the method comprising impregnating a tape strip with an electrically conductive carbonaceous material, spirally winding said strip to define an inside-coated tube, and simultaneously heating said strip during winding to render the inside of said tube seal-tight, spirally winding strips of non-conductive material on the outside of said tube to form concentrically disposed outer plies adjacent therewith.

10. In a dry cell provided with an internally disposed anode and an electrolytic solution thereabout, a tubular container-cathode for said dry cell comprising a plurality of helically spirally wound plies defining a cellular casing and including an inner ply, an outer ply concentrically disposed in relation thereto, and at least one intermediate ply contiguously disposed between said inner and outer plies, said inner ply carrying an electrically conductive carbonaceous material disposed coextensively therewith.

11. In the dry cell set forth in claim 10, said inner ply comprising a foraminous fibrous tape impregnated with electrically conductive carbonaceous material.

12. In the dry cell set forth in claim 10, said carbonaceous material being incorporated in a foraminous fibrous tape bonded to the inside of said inner ply.

13. In the dry cell set forth in claim 10, said inner ply comprising an open-mesh, fibrous tape impregnated with an electrically conductive carbonaceous material and binder therefor, and said intermediate ply adjacent said inner ply being a metal foil provided with a coating of like carbonaceous material and binder, thereby retaining said last mentioned intermediate ply and said inner ply in assembled relation.

14. A container-cathode for a primary galvanic cell, comprising a multi-ply tube, including an inner ply and a plurality of concentrically disposed outer plies, the inner ply of said tube carrying a spirally wound conductive carbonaceous composition adapted to serve as the cathode for the cell, the outer plies of said tube being electrically non-conductive and intimately bonded to each other and to said inner ply, whereby said tube constitutes a container for the elements of a cell and a cathodic electrode therefor.

15. In a dry cell equipped with a container having a plurality of tube-shaped, helically spirally wound plies, the outer ply being non-conductive, the improvement comprising the combination of an inner electrically conductive carbonaceous ply constituting the inside wall of said container, and acting as the cathode of said cell.

References Cited in the file of this patent
UNITED STATES PATENTS

| | | |
|---|---|---|
| 1,613,585 | Dam | Jan. 4, 1927 |
| 2,257,129 | Ruben | Sept. 30, 1941 |
| 2,579,743 | Kurlandsky | Dec. 25, 1951 |
| 2,605,299 | Teas | July 29, 1952 |